(12) United States Patent
Chang

(10) Patent No.: US 12,015,448 B1
(45) Date of Patent: Jun. 18, 2024

(54) FAST FREQUENCY MULTIPLEXED OPTICAL NETWORK CHANNEL IDENTIFICATION

(71) Applicant: VeEX Inc., Fremont, CA (US)

(72) Inventor: Paul Chang, Fremont, CA (US)

(73) Assignee: VeEX Inc., Fremont, CA (US)

( * ) Notice: Subject to any disclaimer, the term of this patent is extended or adjusted under 35 U.S.C. 154(b) by 156 days.

(21) Appl. No.: 17/211,558

(22) Filed: Mar. 24, 2021

Related U.S. Application Data

(60) Provisional application No. 63/136,935, filed on Jan. 13, 2021.

(51) Int. Cl.
  *H04B 10/572* (2013.01)
  *H04B 10/61* (2013.01)
  *H04J 14/02* (2006.01)

(52) U.S. Cl.
  CPC ....... *H04B 10/572* (2013.01); *H04B 10/6166* (2013.01); *H04J 14/02* (2013.01)

(58) Field of Classification Search
  None
  See application file for complete search history.

(56) References Cited

U.S. PATENT DOCUMENTS

| | | | | | |
|---|---|---|---|---|---|
| 5,712,937 | A * | 1/1998 | Asawa | ............... | G02B 6/12007 385/12 |
| 6,466,349 | B1 * | 10/2002 | Valley | .................. | G02B 6/4232 398/182 |
| 2003/0067651 | A1 * | 4/2003 | Wan | ..................... | H04J 14/0298 398/91 |
| 2006/0153496 | A1 * | 7/2006 | Tanobe | .............. | H04Q 11/0062 385/24 |
| 2008/0181612 | A1 * | 7/2008 | Mills | ................... | H04J 14/0221 398/83 |
| 2010/0150566 | A1 * | 6/2010 | Soto | ...................... | H04B 10/272 398/115 |
| 2011/0293279 | A1 * | 12/2011 | Lam | ........................ | H04J 14/02 398/79 |
| 2015/0189407 | A1 * | 7/2015 | Jiang | .................. | H04B 10/2537 398/34 |
| 2020/0092027 | A1 * | 3/2020 | Yu | ....................... | H04J 14/0264 |

\* cited by examiner

*Primary Examiner* — David W Lambert
(74) *Attorney, Agent, or Firm* — Sheppard Mullin Richter & Hampton LLP

(57) ABSTRACT

A system comprising a generator and a receiver. The generator can be coupled to an optical network. The generator can be configured to generate a plurality of wavelengths of light. The plurality of wavelengths of light can be continuously cycled. The plurality of wavelengths of light can be modulated to encode information onto the plurality of wavelengths of light. The plurality of wavelengths of light can be multiplexed into a multiplexed light signal. The multiplexed light signal can be provided to a first wavelength division multiplexer of the optical network. The receiver can be coupled to the generator and the optical network. The receiver can be configured to receive a demultiplexed wavelength of light from a second wavelength division multiplexer of the optical network. The demultiplexed wavelength of light can be demodulated to decode information encoded onto the demultiplexed wavelength of light. Optical power of the demultiplexed wavelength of light can be measured. The decoded information and the optical power can be provided for display through an interface.

20 Claims, 14 Drawing Sheets

400

| Header Information 402 | Frequency Information 404 | Optical Power Information 406 | Identification Information 408 |

FIGURE 4

FAST FREQUENCY MULTIPLEXED OPTICAL NETWORK CHANNEL IDENTIFICATION

CROSS-REFERENCE TO RELATED APPLICATIONS

This application claims priority to U.S. Provisional Patent Application No. 63/136,935, filed on Jan. 13, 2021 and entitled "FAST FREQUENCY MULTIPLEXED OPTICAL NETWORK CHANNEL IDENTIFICATION," which is incorporated herein by reference in its entirety.

FIELD OF THE INVENTION

The present technology relates to optical networks. More particularly, the present technology relates to channel identification in optical networks.

BACKGROUND

Modern network infrastructure can comprise optical networks. Because signaling in optical networks is based on light (e.g., laser), optical networks can have a much higher data throughput than copper-based networks. Furthermore, latency associated with optical networks can be much lower than latency of copper-based networks. An optical network, such as a fiber optic network, can comprise a plurality of fiber optic cables. A fiber optic cable can have its ends coupled to a cascade of optical multiplexers and optical demultiplexers. An optical multiplexer can multiplex (combine) various wavelengths of light into a multiplexed light signal that can be transmitted through a fiber optic cable with each wavelength of light carrying data corresponding to a particular channel of an optical network. An optical demultiplexer can demultiplex (segregate) a multiplexed light signal received through a fiber optic cable to recover constituent wavelengths of light.

SUMMARY

Various embodiments of the present technology can include a method and a device configured to generate a plurality of wavelengths of light. The plurality of wavelengths of light can be continuously cycled. The plurality of wavelengths of light can be modulated to encode information onto the plurality of wavelengths of light. The plurality of wavelengths of light can be multiplexed into a multiplexed light signal. The multiplexed light signal can be provided to a wavelength division multiplexer of an optical network.

In some embodiments, the plurality of wavelengths of light can correspond to center frequencies of channels of the wavelength division multiplexer.

In some embodiments, the multiplexed light signal can be provided to an express port of the wavelength division multiplexer.

In some embodiments, the information can include at least one of frequency information or optical power information associated with the plurality of wavelengths of light.

In some embodiments, wherein the information can include identification information associated with the device.

In some embodiments, the information associated with the plurality of wavelengths of light can be encoded into the multiplexed light signal based at least on one of a non-return-to-zero, pulse-amplitude modulation, phase-shift keying, or frequency-shift keying technique.

In some embodiments, a portion of the plurality wavelengths of light can be extracted prior to the multiplexing. Optical power of the portion of the plurality wavelengths of light can be measured. Optical power of the plurality of wavelengths of light can be adjusted based on the optical power of the portion of the plurality wavelengths of light.

In some embodiments, the plurality wavelengths of light can be adjusted to a selected optical power level prior to the multiplexing.

In some embodiments, a portion of the plurality wavelengths of light can be extracted prior to the multiplexing. Optical power of the portion of the plurality wavelengths of light can be measured. An optical power attenuation level of the plurality wavelengths of light can be adjusted based on the optical power of the portion of the plurality wavelengths of light.

In some embodiments, the information encoded onto the plurality wavelengths of light is decoded and a determination of insertion loss can be associated with the optical network based on the information.

In some embodiments, the plurality of wavelengths of light can be a portion of the wavelengths of light that are capable of being generated by the device.

In some embodiments, the plurality of wavelengths of light can include at least two types of wavelengths of light that have a different wavelength. A first type of wavelengths of light can have a wider channel width than a second type of wavelengths of light.

In some embodiments, the plurality of wavelengths of light that are of the first type can correspond to center frequencies of channels of at least one coarse wavelength division multiplexer and the plurality of wavelengths of light that are of the second type can correspond to center frequencies of channels of at least one dense wavelength division multiplexer.

In some embodiments, the plurality of wavelengths of light can be generated by one or more light sources.

In some embodiments, at least one wavelength of light of a first type and at least one wavelength of light of a second type can be simultaneously generated.

Various embodiments of the present technology can include a method and a device configured to receive a demultiplexed wavelength of light from a wavelength division multiplexer of an optical network. The demultiplexed wavelength of light can be demodulated to decode information encoded onto the demultiplexed wavelength of light. Optical power of the demultiplexed wavelength of light can be measured. The information and the optical power can be provided for display through an interface.

In some embodiments, the information can include at least one of frequency information associated with the demultiplexed wavelength of light, optical power information associated with the demultiplexed wavelength of light measured at a transmitting end of the optical network, or identification information associated with a generator from which the demultiplexed wavelength of light was generated.

In some embodiments, insertion loss associated with the optical network can be determined based on the information and the optical power. The insertion loss can be provided for display through the interface.

In some embodiments, the demultiplexed wavelength of light can be demultiplexed from a multiplexed light signal generated by a generator at a transmitting end of the optical network through the wavelength division multiplexer.

Various embodiments of the present technology can include a system comprising a generator and a receiver. The generator can be coupled to an optical network. The generator can comprise a light source, an optical signal modulator, an optical multiplexer, a power supply, and one or more first processors. The light source can be configured to generate a plurality of wavelengths of light. The optical signal modulator can be coupled to the light source and configured to modulate the plurality of wavelengths of light to encode information onto the plurality of wavelengths of light. The optical multiplexer can be coupled to the optical signal modulator and configured to multiplex the plurality of wavelengths of light into a multiplexed light signal. The power supply can be coupled to the light source and configured to provide power to the light source. The one or first more processors can be coupled to the power supply and the optical signal modulator, and configured to control the power supply and the optical signal modulator. The receiver can be coupled to the generator and the optical network. The receiver can comprise an optical signal demodulator, an optical power meter, and one or more second processors. The optical signal demodulator can be configured to receive a demultiplexed wavelength of light through the optical network and decode information encoded onto the demultiplexed wavelength of light. The demultiplexed wavelength of light can be associated with the multiplexed light signal The optical power meter can be coupled to the optical signal demodulator and configured to measure optical power of the demultiplexed wavelength of light. The one or more second processors can be coupled to the optical signal demodulator and the optical power meter, and configured to provide the decoded information and the optical power for display through an interface.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

BRIEF DESCRIPTION OF THE DRAWINGS

FIG. 4 illustrates an example data packet, according to various embodiments of the present technology.

Figure 1A:
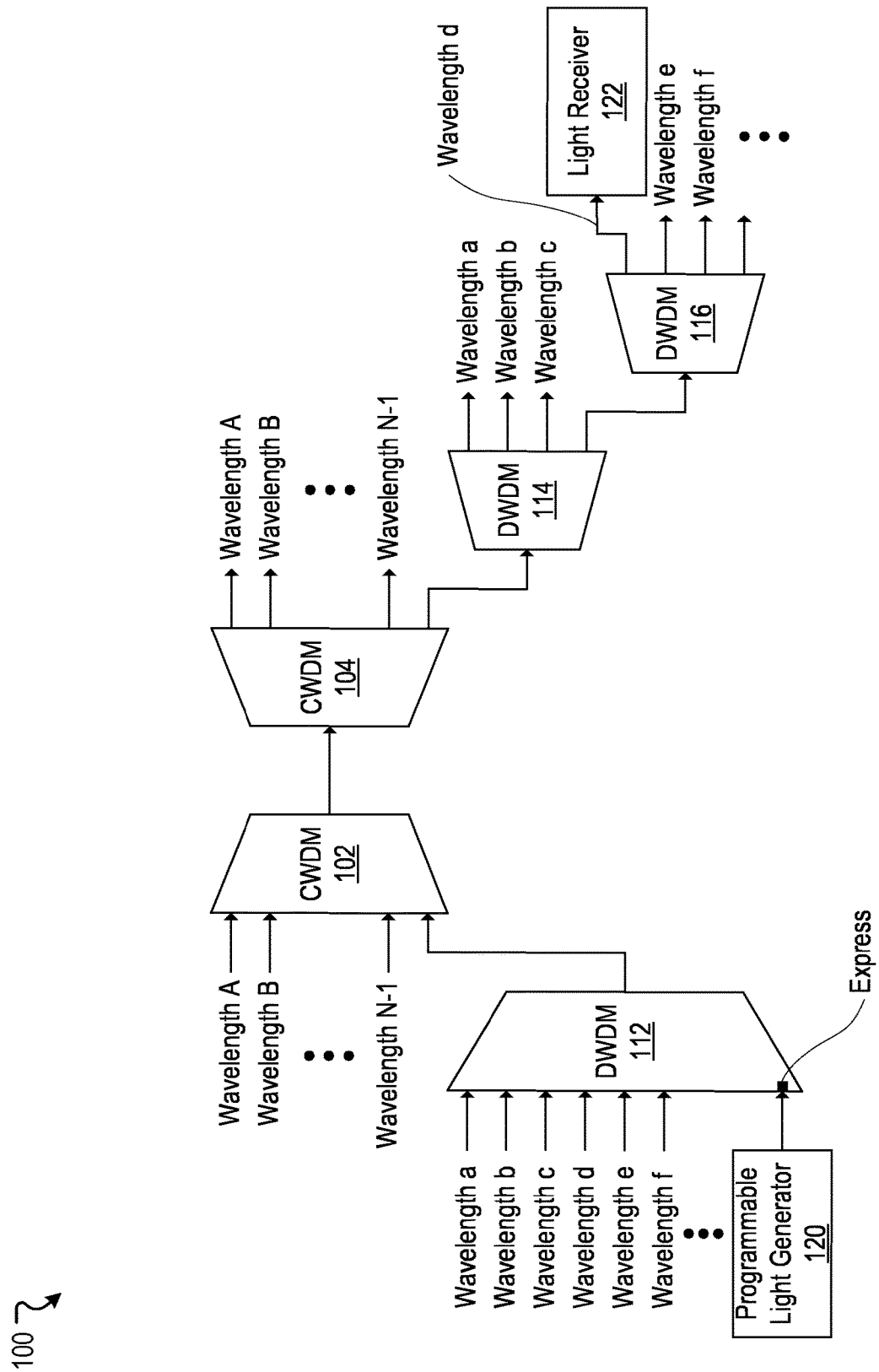
FIGS. 1A-1E illustrate an example optical network, according to various embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Identifying Fast Frequency Multiplexed Optical Network Channels

Modern network infrastructure can comprise optical networks. Because signaling in optical networks is based on light (e.g., laser), optical networks can have a much higher data throughput than copper-based networks. Furthermore, latency associated with optical networks can be much lower than latency of copper-based networks. An optical network, such as a fiber optic network, can comprise a plurality of fiber optic cables. A fiber optic cable can have its ends coupled to a cascade of optical multiplexers and optical demultiplexers. An optical multiplexer can multiplex (combine) various wavelengths of light into a multiplexed light signal that can be transmitted through a fiber optic cable with each wavelength of light carrying data corresponding to a particular channel of an optical network. An optical demultiplexer can demultiplex (segregate) a multiplexed light signal received through a fiber optic cable to recover constituent wavelengths of light.

Signals corresponding to channels in an optical network are multiplexed and demultiplexed numerous times in numerous stages. Accordingly, verifying that the signals are being properly transmitted along the optical network, and are being correctly multiplexed and demultiplexed through correct channels, can be challenging. Under conventional approaches, to verify that signals are being properly transmitted, including multiplexed and demultiplexed, along an optical network, a particular wavelength of light can be injected at an input channel of the optical network. This particular wavelength of light can be multiplexed and demultiplexed through the optical network. An optical spectrum analyzer can be coupled to an output channel to receive the particular wavelength of light. The optical spectrum analyzer can analyze a waveform of the particular wavelength of light to verify that the received signal corresponds to the injected wavelength of light. Such conventional approaches of identifying channels of an optical network have many disadvantages. For example, configuring a light source to generate wavelengths of light and injecting the generated wavelengths of light into various input channels can be time consuming. Furthermore, an optical spectrum analyzer can be expensive and is generally intended for laboratory use, and not optimally adapted for field use. In this regard, use of an optical spectrum analyzer to verify waveforms of light can be difficult for on-site field personnel. As such, conventional approaches of identifying channels of an optical network can be problematic.

Disclosed herein is an improved approach rooted in technology that overcomes the foregoing and other disadvantages described above. In various embodiments, a programmable light generator in conjunction with a light receiver can be used to identify channels of an optical network. A signal generated by the programmable light generator can be injected into an input channel of the optical network. The signal can be received by the light receiver at an output channel of the optical network and analyzed to ensure that the output channel corresponds to the input channel. In various embodiments, the programmable light generator can comprise a light source, an optical signal modulator, and an optical multiplexer. The light source can be coupled to the optical signal modulator. The light source can be configured to generate various wavelengths of light that can be used to identify the channels of the optical network. The wavelengths of lights can correspond to center frequencies of the channels. The optical signal modulator can modulate the wavelengths of light to encode frequency and other information associated with the wavelengths of light onto the wavelengths of light. For example, the light source can simultaneously generate a plurality of wavelengths of light, such as a first wavelength of light and a second wavelength of light. In this example, the first wavelength of light and the second wavelength of light can be modulated by the optical signal modulator to encode respective frequency and optical power information onto the first wavelength of light and the second wavelength of light, respectively. As another example, the light source can continuously generate and cycle through a plurality of wavelengths of light, such as a first wavelength of light and a second wavelength of light. In this example, the first wavelength of light and the second wavelength of light can be modulated by the optical signal modulator to encode respective frequency and optical power information onto the first wavelength of light and the second wavelength of light, respectively. In some cases, the optical signal modulator can further encode identification information associated with the programmable light generator onto the wavelengths of light. In this way, when the wavelengths of light are demodulated at some point downstream in the optical network by the light receiver, the frequency information, the optical power information, and the identification information can be decoded and provided to on-site field personnel for identification of channels. The optical signal modulator can be coupled to the optical multiplexer. The optical multiplexer can multiplex the wavelengths of light into a multiplexed light signal to be injected into channels of the optical network for identification of channels. In some embodiments, the programmable light generator can further include an optical attenuator and an optical power meter. The optical attenuator and the optical power meter can be coupled between the optical signal modulator and the optical multiplexer. The optical attenuator can adjust optical power of the wavelengths of light and the optical power meter can measure the optical power of the wavelengths of light prior to multiplexing the wavelengths of light through the optical multiplexer. In some cases, the programmable light generator can include more than one light source, more one optical signal modulator, more than one optical tap, and more than one optical power meter. The multiplexed light signal generated by the programmable light generator can be injected into input channels of the optical network.

The light receiver can be configured to receive the multiplexed light signal at an output channel of the optical network. By the time the light receiver receives the multiplexed light signal at the output channel, the multiplexed light signal has been demultiplexed through the optical network such that only a wavelength of light corresponding to the output channel is received by the light receiver. In various embodiments, the light receiver can comprise an optical signal demodulator and an optical power meter. The optical signal demodulator can be configured to demodulate the wavelength of light to decode information encoded in the wavelength of light. For example, frequency and optical power information encoded onto a wavelength of light can be demodulated to decode the frequency and the optical power information. The optical power meter can be coupled to the optical signal demodulator. The optical power meter can measure optical power of the wavelength of light received by the light receiver. Based on the measured optical power and the decoded optical power, the light receiver can determine an insertion loss for the optical network. These and other inventive features of the present technology will be discussed in further detail herein.

FIG. 1A illustrates an example optical network 100, according to various embodiments of the present technology. In various embodiments, the optical network 100 can be a fiber optic network. The optical network 100 can have a transmitting end and a receiving end. Signals associated with the optical network 100 can travel from the transmitting end to the receiving end. Although the optical network 100 of FIG. 1A shows signals traveling unidirectionally, in some embodiments, the optical network 100 can be configured such that signals travel bidirectionally. In such embodiments, the ends of the optical network 100 can both transmit and receive signals. As shown in FIG. 1A, in some embodiments, the optical network 100 can comprise coarse wavelength division multiplexers (CWDMs) 102,104 and dense wavelength division multiplexers (DWDMs) 112, 114, 116. A wavelength division multiplexer (WDM), such as the CWDMs 102, 104 or the DWDMs 112, 114, 116, can be configured as a multiplexer or a demultiplexer. When a WDM is configured as a multiplexer, the WDM can multiplex (combine) one or more wavelengths of light into a multiplexed light signal. When a WDM is configured as a demultiplexer, the WDM can demultiplex (segregate) a multiplexed light signal into its constituent wavelengths of light. In general, multiplexing can improve channel bandwidth utilization of optical assets. For example, a fiber optic cable can carry a light signal (e.g., data signal) at a particular wavelength. In this example, if multiplexing is used, the same fiber optic cable can carry multiple wavelengths of light (e.g., multiple data signals) as a single multiplexed light signal, thereby increasing channel bandwidth utilization (e.g., data throughput) of the fiber optic cable. Whether a WDM is classified as a CWDM or a DWDM generally depends on a number of channels (e.g., wavelengths of light) the WDM is capable of multiplexing or demultiplexing. In many cases, a CWDM can multiplex or demultiplex upwards of 18 channels, while a DWDM can multiplex or demultiplex upwards of 90 channels. In some cases, the CWDM can multiplex or demultiplex more or less than 18 channels. Likewise, in other cases, the DWDM can multiplex or demultiplex more or less than 90 input channels. Many variations are contemplated.

Referring back to FIG. 1A, WDMs associated with the transmitting end of the optical network 100 can be configured as multiplexers (e.g., the CWDM 102 and the DWDM 112) and WDMs associated with the receiving end of the optical network 100 can be configured demultiplexers (e.g., the CWDM 104 and the DWDMs 114, 116). In this way, various wavelengths of light can be multiplexed into a multiplexed light signal and transmitted from the transmitting end. When the multiplexed light signal reaches the receiving end, the multiplexed light signal can be demultiplexed to its constituent wavelengths of light. In many cases, the transmitting end of the optical network 100 can be associated with a single location or site, while the receiving end can be associated with multiple locations or sites. For example, the transmitting end can be associated with a network service provider (e.g., an internet service provider) at a site providing network services (e.g. internet services) and the receiving end can be associated with switch boxes (e.g., DWDM drops) located at various locations or sites through which the network services are distributed. Therefore, as shown in FIG. 1A, just as one example, the transmitting end can comprise one DWDM drop (e.g., the DWDM 112) through which channels carrying network services are multiplexed, while the receiving end can comprise multiple DWDM drops, with one DWDM drop at each location and through which a portion of the channels is demultiplexed so that the network services can be distributed to, for example, households at each location.

In some embodiments, one or more DWDMs can be coupled to a CWDM to further increase channel bandwidth utilization of a fiber optic cable. In general, a group of wavelengths of light multiplexed by a CWDM can operate at different frequencies than another group of wavelengths of light multiplexed by a DWDM. Thus, the two groups of wavelengths of light can be simultaneously carried by a fiber optic cable without interference. For example, in some embodiments, a CWDM can multiplex wavelengths of light that range from 1270 nm to 1470 nm and a DWDM can multiplex wavelengths of light that range from 1528.77 nm to 1563.86 nm. As such, in this example, because there is no wavelength (frequency) overlap between the two groups of wavelengths of light, multiplexed light signals generated by the CWDM and the DWDM can be simultaneously transmitted through a fiber optic cable, thereby increasing channel bandwidth utilization of the fiber optic cable. As such, given the number of channels associated with CWDMs and the number of channels associated with DWDMs in the optical network 100, verifying that every channel associated with the CWDMs and DWDMs is correctly multiplexed and demultiplexed through the optical network 100 can be difficult.

In some embodiments, the optical network 100 can further include a programmable light generator 120 and a light receiver 122. The programmable light generator 120 in conjunction with the light receiver 122 can be configured to identify channels (e.g., channels of DWDMs) of the optical network 100. As shown in FIG. 1A, the programmable light generator 120 can be coupled to an express port of the DWDM 112 at the transmitting end of the optical network 100. The express port allows a light signal to bypass multiplexing at the DWDM 112. Therefore, a light signal generated by the programmable light generator 120 is a multiplexed light signal that replaces a multiplexed light signal otherwise generated by the DWDM 112. The multiplexed light signal generated by the programmable light generator 120 can comprise wavelengths of light that correspond to center frequencies of input channels of the DWDM 112. As shown, the wavelengths of light that correspond to center frequencies of input channels of the DWDM 112 include "wavelength a," "wavelength b," "wavelength c," etc. In some embodiments, the wavelengths of light in the multiplexed light signal can be modulated by the programmable light generator 120 to encode various information onto the wavelengths of light. The various information can be associated with, for example, frequency information and optical power information associated with the wavelengths of light. The various information also can include, for example, identification information (e.g., device ID) of the programmable light generator 120. The programmable light generator 120 will be discussed in further detail with reference to FIGS. 2A-2D. The multiplexed light signal generated by the programmable light generator 120 can be routed through the express port of the DWDM 112 and the CWDM 102.

The light receiver 122 can be coupled to an output channel of the DWDM 116 at the receiving end of the optical network 100. Although in FIG. 1A the light receiver 122 is shown to be coupled to an output channel of the DWDM 116, in various embodiments, the light receiver 122 can be coupled to any output channels of any DWDMs at the receiving end. For example, the light receiver 122 can be coupled to any output channel of the DWDM 114 (e.g., "wavelength a," "wavelength b," or "wavelength c"). As another example, the light receiver 112 can be coupled to output channels of any DWDMs downstream from the DWDM 116 (not shown). Many variations are possible. By the time the light receiver 122 receives the multiplexed light signal generated by the programmable light generator 120, the multiplexed light signal has been demultiplexed by the CWDM 104 and the DWDMs 114, 116. Therefore, the signal received by the light receiver 122 is a particular wavelength of light (e.g., "wavelength d") that corresponds to a center frequency of the output channel to which the light receiver 122 is coupled. In some embodiments, the light receiver 122 can be configured to demodulate the wavelength of light to decode frequency information, optical power information, and identification information encoded in the wavelength of light. In some embodiments, the light receiver 122 can provide the frequency information, the optical power information, and the identification information through a user interface of the light receiver 122 to a user (e.g., on-site field personnel) operating the light receiver 122. The frequency information encoded in the wavelength of light can be used by the user to verify that the wavelength of light was properly transmitted, and correctly multiplexed and demultiplexed, through the optical network 100. For example, a 1577.03 nm light can be received by the light receiver 122 through an output channel with a center frequency of 190.1 THz. In this example, frequency information (i.e., 190.1 THz) encoded onto the 1577.03 nm light can be decoded by the light receiver 122 and used to verify that the 1577.03 nm light was correctly multiplexed and demultiplexed to the output channel by verifying the decode frequency information matching the center frequency of the output channel. The optical power information can be used by the user to determine an insertion loss for the optical network 100. The identification information can be used by the user to determine that the wavelength of light received by the light receiver 122 was generated from a known light source (e.g., the programmable light generator 120). After analysis of the signal of the output channel of the DWDM 116, the light receiver 122 can be decoupled from the output channel and coupled to another output channel of the DWDM 116 (e.g., "wavelength e" or "wavelength f") to determine whether that channel is being correctly multiplexed and demultiplexed through the optical network 100. The light receiver 122 will be discussed in further detail with reference to FIG. 3.

Figure 1B:
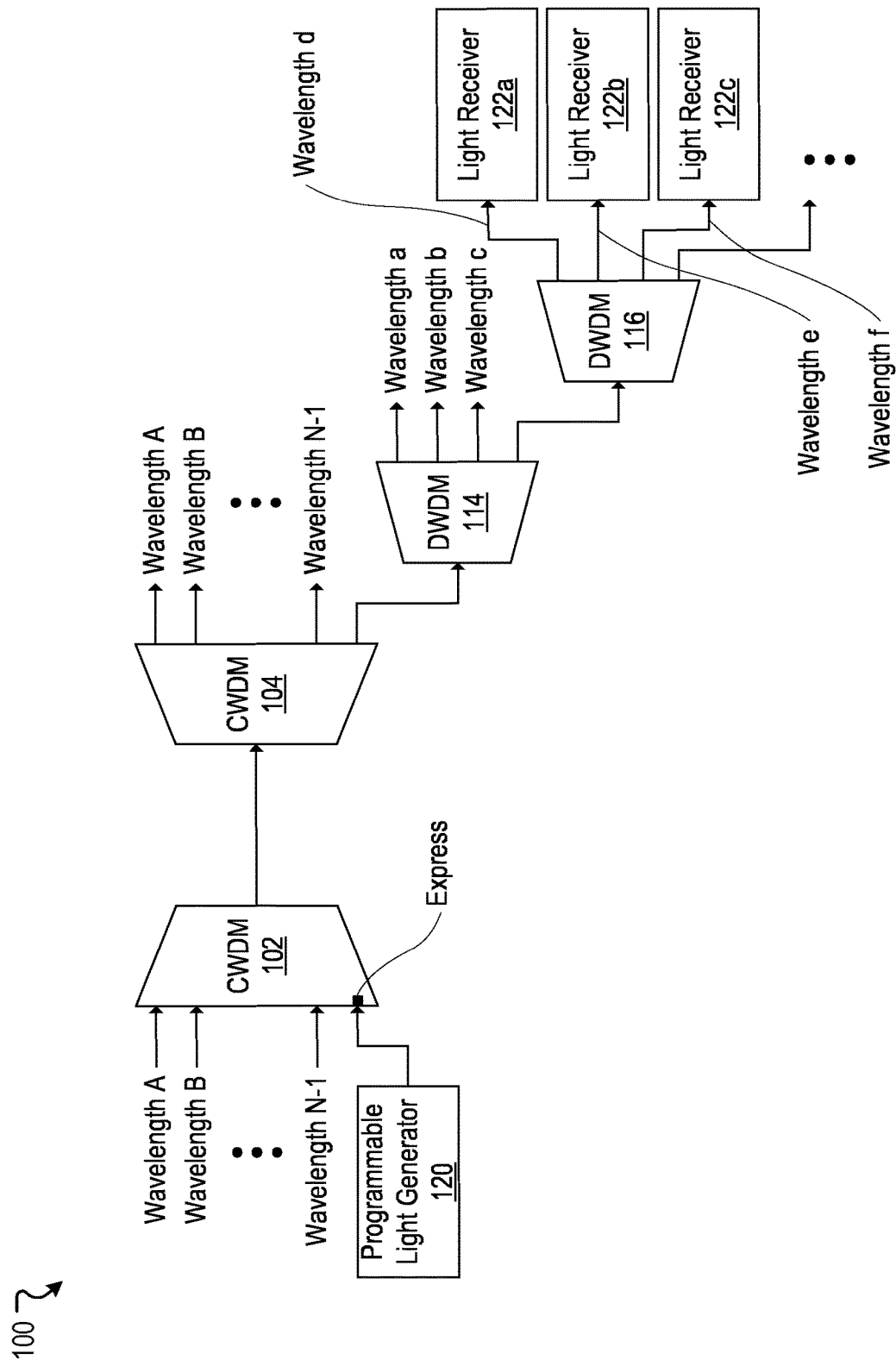

FIG. 1B illustrates a variation of the example optical network 100, according to various embodiments of the present technology. As shown in FIG. 1B, in some embodiments, the programmable light generator 120 can be coupled to an express port of the CWDM 102 at the transmitting end of the optical network 100, thereby bypassing multiplexing at the CWDM 102. In this way, a multiplexed light signal generated by the programmable light generator 120 can travel through the optical network 100 without further multiplexing. Also shown in FIG. 1B, a plurality of light receivers 122a-122c can be coupled to output channels of the DWDM 116. The light receivers 122a-122c can simultaneously demodulate wavelengths of light received at respective output channels to decode information encoded in the wavelengths of light, such as frequency information, optical power information, and identification information. Accordingly, multiple output channels can be detected at the same time, hence reducing the time needed to identify the output channels. In some cases, additional light receivers can be used to further reduce the time needed to identify output channels. For example, in FIG. 1B, in addition to the light receivers 122a-122c, additional light receivers can be coupled to output channels of the DWDM 114. In this way, wavelengths of light received at the output channels of the DWDM 114 and the DWDM 116 can be simultaneously demodulated to verify that the wavelengths of light are being outputted to correct output channels.

Figure 1C:
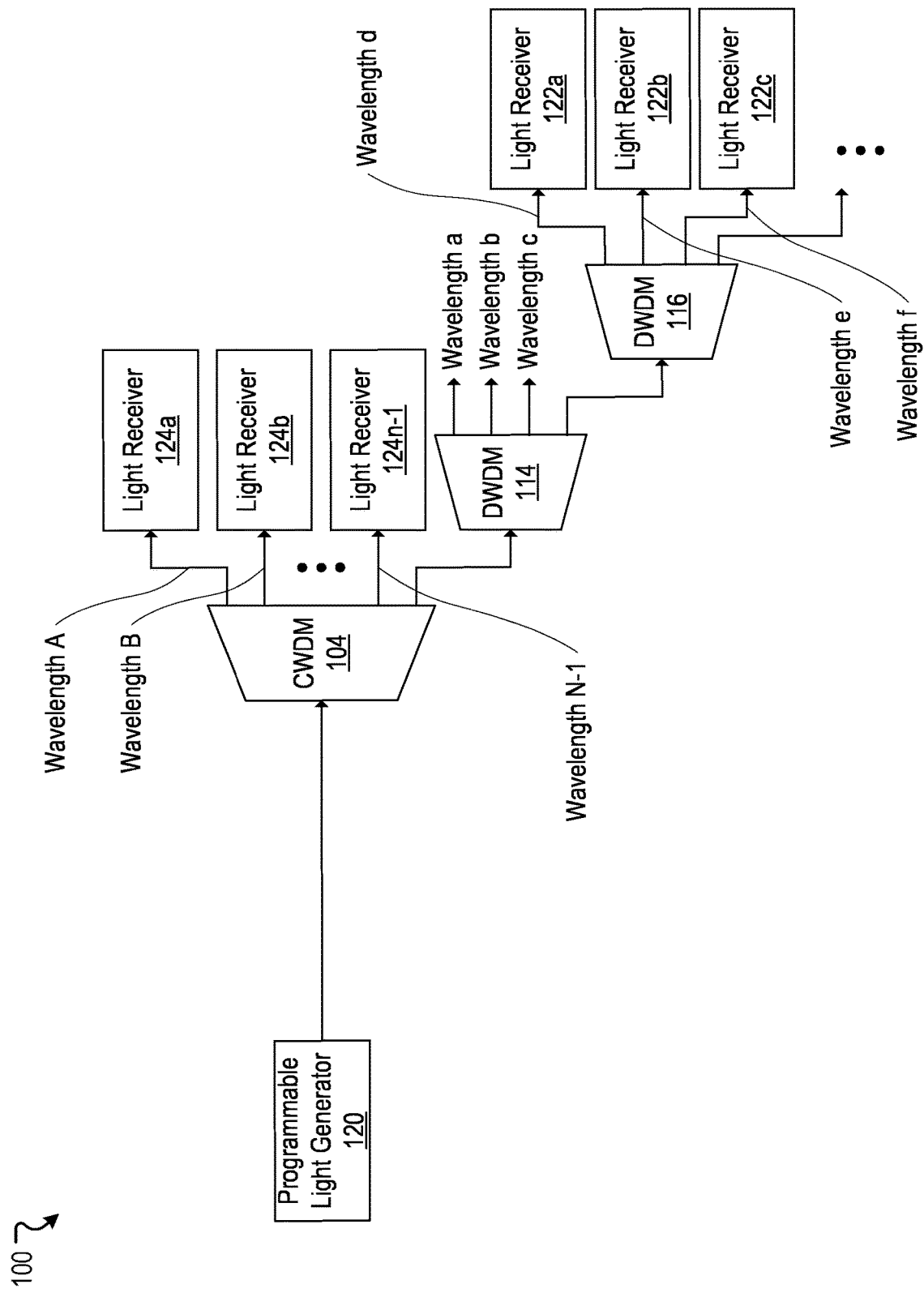

FIG. 1C illustrates a variation of the example optical network 100, according to various embodiments of the present technology. As shown in FIG. 1C, in some embodiments, the programmable light generator 120 can be coupled directly to a fiber optic cable of the optical network 100. In such embodiments, the programmable light generator 120 can be configured to generate a multiplexed light signal that comprises different types of wavelengths of light that correspond to types of WMDs associated with the optical network 100. For example, the optical network shown in FIG. 1C can comprise the CWDM 104 and the DWDMs 114, 116. In this example, the programmable light generator 120 can generate a multiplexed light signal that comprises wavelengths of light of a first type and wavelengths of light of a second type. The wavelengths of light of the first type can correspond to center frequencies of channels of the CWDM 104 (e.g., "wavelength A," "wavelength B," etc.). The wavelengths of light of the second type can correspond to center frequencies of channels of the DWDMs 114, 116 (e.g., "wavelength a," "wavelength b," etc.). Also shown in FIG. 1C, the plurality of light receivers 122a-122c can be coupled to output channels of the DWDM 116 and a plurality of light receivers 124a-124n-1 can be coupled to output channels of the CWDM 104. The light receivers 122a-122c can simultaneously demodulate the wavelengths of light of the second type received at respective output channels of the DWDM 116 to decode information encoded in the wavelengths of light of the second type, such as frequency information, optical power information, and identification information. Similarly, the light receivers 124a-124n-1 can simultaneously demodulate the wavelengths of light of the first type received at respective output channels of the CWDM 104 to decode information encoded in the wavelengths of light of the first type, such as frequency information, optical power information, and identification information. Accordingly, multiple output channels can be detected at the same time, hence reducing the time needed to identify the output channels. A programmable light generator capable of generating a multiplexed light signal comprising different types of wavelengths of light will be discussed in further detail with reference to FIG. 2D.

Figure 1D:
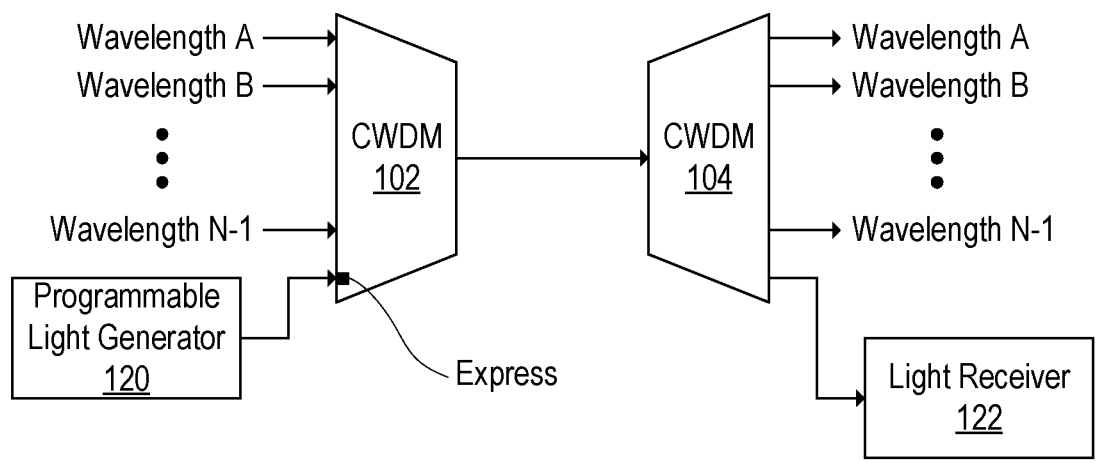

FIG. 1D illustrates a variation of the example optical network 100, according to various embodiments of the present technology. As shown in FIG. 1D, in some embodiments, the programmable light generator 120 can be coupled to an express port of the CWDM 102 at the transmitting end of the optical network 100, thereby bypassing multiplexing at the CWDM 102. In such embodiments, the programmable light generator 120 can be configured to generate a multiplexed light signal comprising wavelengths of light that correspond to channels of DWDMs (e.g., the DWDMs 114, 116 of FIGS. 1A-1C). The wavelengths of light can be continuously cycled. The light receiver 122 can be coupled to an output channel of the CWDM 104 to receive the multiplexed light signal. The light receiver 122 can be configured to demodulate the multiplexed light signal to decode information encoded in the multiplexed light signal, such as frequency information, optical power information, and identification information corresponding to the continuously cycled wavelengths of light. Based on the frequency information encoded onto each of the continuously cycled wavelengths of light, the light receiver 122 can verify that the wavelengths of light generated by the programmable light generator 120 correspond to channels of the DWDMs and that these channels are or have been correctly multiplexed and demultiplexed through the optical network 100.

Figure 1E:
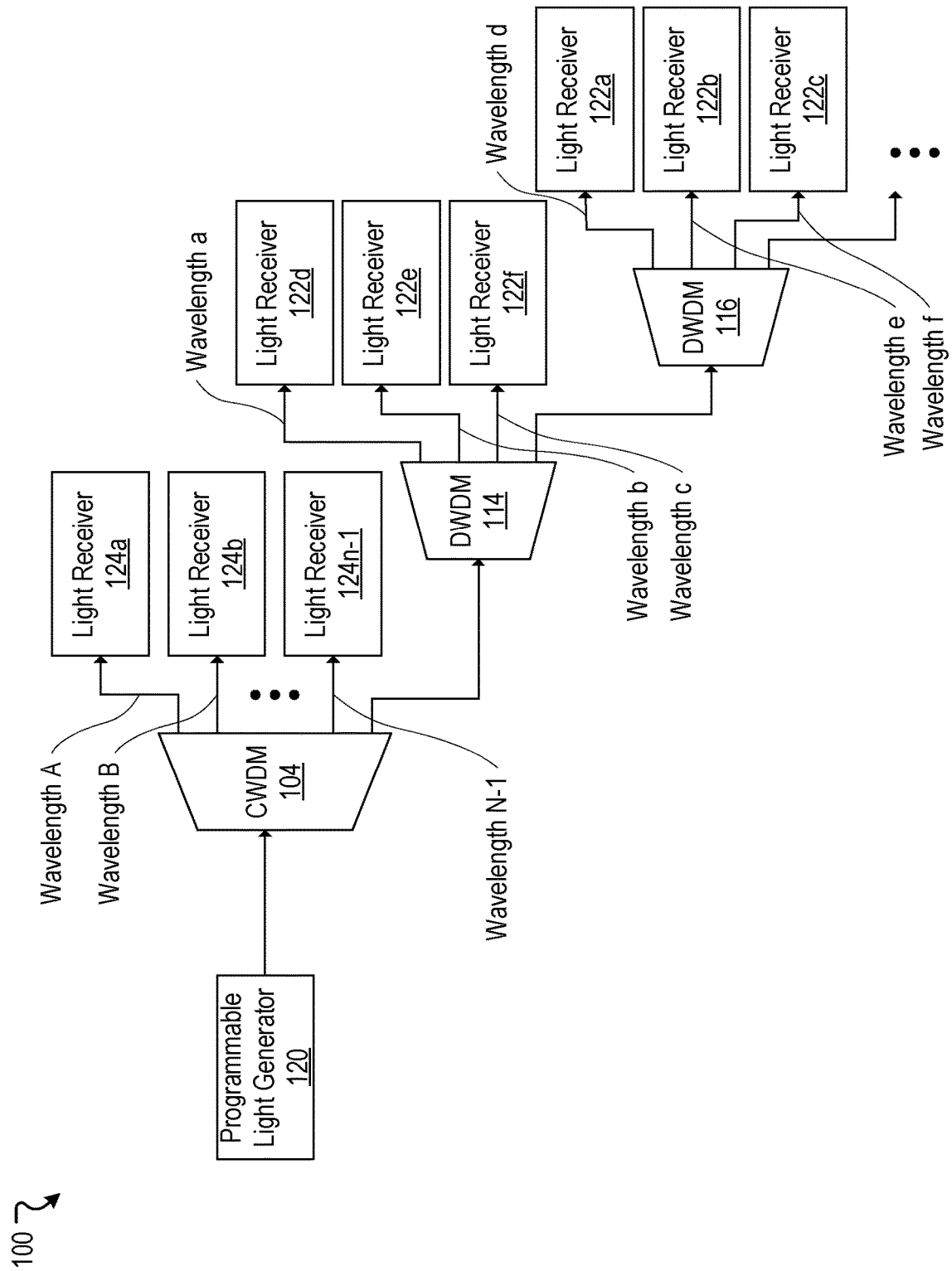

FIG. 1E illustrates a variation of the example optical network 100, according to various embodiments of the present technology. As shown in FIG. 1E, in some embodiments, the programmable light generator 120 can be coupled directly to a fiber optic cable of the optical network 100. The programmable light generator 120 can be configured to generate a multiplexed light signal comprising any selected number (e.g., two, three, four, etc.) of different groups of wavelengths of light, with each group of wavelengths of light corresponding to a particular WDM of the optical network 100. For example, the programmable light generator 120 can generate a multiplexed light signal comprising a first group of wavelengths of light that can be received by the light receivers 124a-124n-1 to identify channels of the CWDM 104. The multiplexed light signal can further comprise a second group of wavelengths of light and a third group of wavelengths of light that can be received by the light receivers 122d-122f and the light receivers 122a-122c, respectively, to identify channels of the DWDMs 114, 116. In this example, multiple WDM channels can be detected at the same time, hence reducing the time needed to identify the channels. A programmable light generator capable of generating a multiplexed light signal comprising different groups of wavelengths of light will be discussed in further detail with reference to FIG. 2D.

Figure 2A:
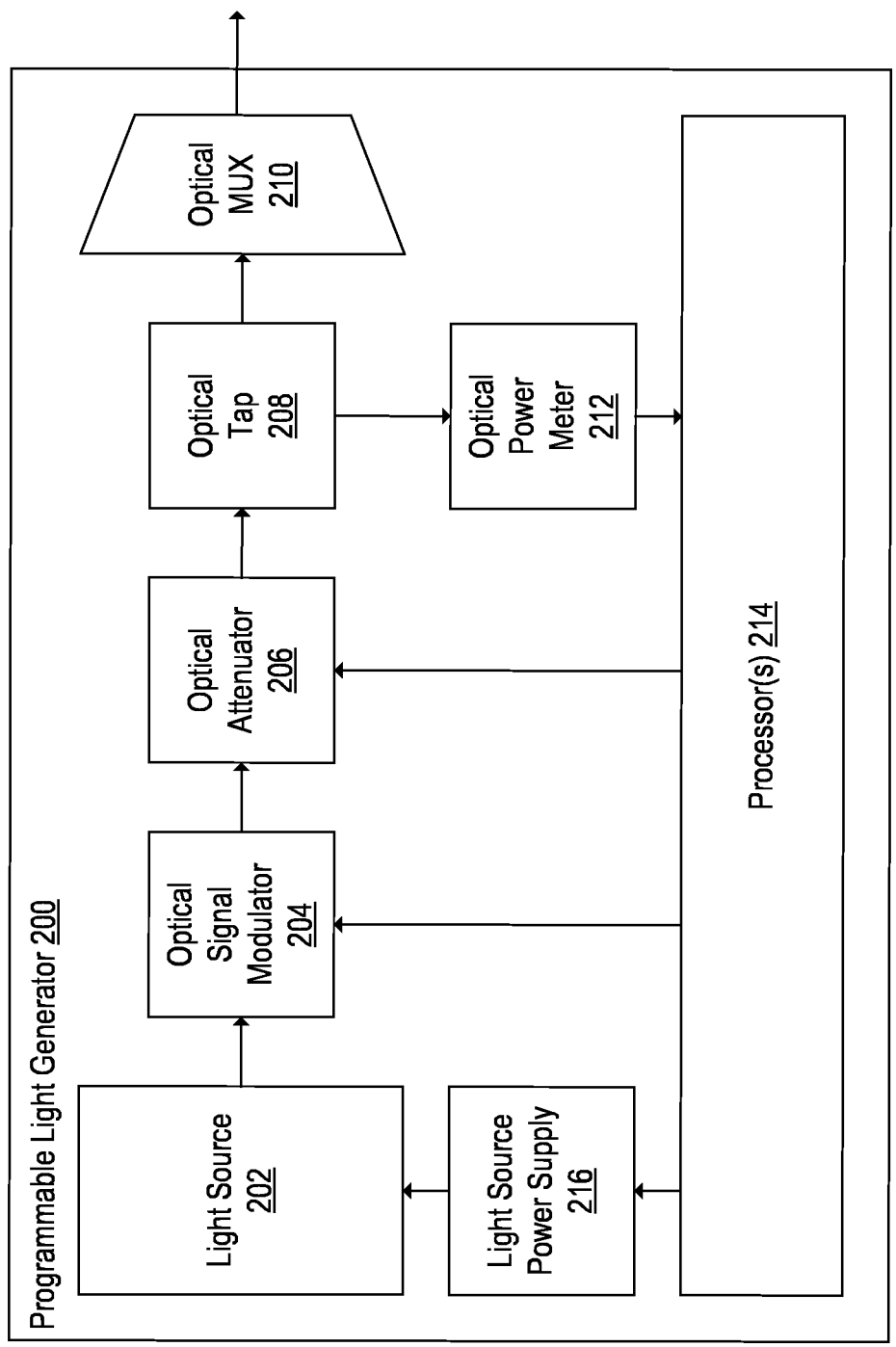
FIGS. 2A-2D illustrate example programmable light generators, according to various embodiments of the present technology.

FIG. 2A illustrates an example programmable light generator 200, according to various embodiments of the present technology. In some embodiments, the programmable light generator 120 of FIGS. 1A-1B, 1D can be implemented as the programmable light generator 200. As discussed above, the programmable light generator 200 can generate a multiplexed light signal that can be used in conjunction with a light receiver (e.g., the light receiver 122 of FIGS. 1A-1B, 1D) to identify channels of an optical network (e.g., the optical network 100 of FIGS. 1A-1E). In some embodiments, the programmable light generator 200 can comprise a light source 202, an optical signal modulator 204, an optical attenuator 206, an optical tap 208, an optical multiplexer 210, an optical power meter 212, one or more processors 214, and a light source power supply 216. The light source 202 can be configured to generate various wavelengths of light that can be multiplexed by the optical multiplexer 210. As just one example, the light source 202 can generate light in 1547.72 nm, 1548.51 nm, 1549.32 nm, 1550.12 nm, 1550.92 nm, 1551.72 nm, 1552.52 nm, and 1553.33 nm wavelengths. In this example, these wavelengths can be multiplexed by a multiplexer operating in a 1550 nm wavelength range. In some cases, each wavelength of light generated by the light source 202 can correspond to a center frequency of a channel of a multiplexer (e.g., the DWDM 112 of FIG. 1A) of the optical network. In some embodiments, the light source 202 can be implemented using a plurality of fixed wavelength lasers with each fixed wavelength laser producing a particular wavelength of light. For example, the light source 202 can be implemented using eight different fixed wavelength lasers with each fixed wavelength laser producing a wavelength of light. In some embodiments, the light source 202 can be implemented using one or more tunable lasers. Unlike a fixed wavelength laser, a tunable laser can be configured to generate multiple wavelengths of lights. For example, the light source 202 can be implemented using one tunable laser capable of producing light in 1547.72 nm, 1548.51 nm, 1549.32 nm, 1550.12 nm, 1550.92 nm, 1551.72 nm, 1552.52 nm, and 1553.33 nm wavelengths. As another example, the light source 202 can be implemented using two tunable lasers with a first tunable laser capable of producing light in 1547.72 nm, 1548.51 nm, 1549.32 nm, and 1550.12 nm wavelengths and a second tunable laser capable of producing light in 1550.92 nm, 1551.72 nm, 1552.52 nm, and 1553.33 nm wavelengths. Many variations are possible. For example, in some embodiments, the light source 202 can be implemented using one of or any suitable combination of tunable lasers, fixed wavelength lasers, or other types of lasers.

In some embodiments, the light source 202 can be configured to continuously generate and cycle through a selected number of wavelengths of light that can be multiplexed by the optical multiplexer 210. In such embodiments, the light source 202 can generate a first wavelength of light at a first time, a second wavelength of light at a second time, a third wavelength of light at a third time, and so on, until the rest of the wavelengths of light are generated, at which point the light source 202 goes back to generating the first wavelength of light and the cycle repeats. For example, the light source 202 can be configured to generate a selected number of wavelengths of light (e.g., 32 wavelengths of light or channels of light) with each wavelength of light corresponding to a center frequency of a channel of a DWDM (e.g., the DWDM 114 and/or the DWDM 116 of FIGS. 1A-1C). In this example, the light source 202 can be configured to continuously generate and cycle through the selected number of wavelengths of light. In some embodiments, the light source 202 can be configured to continuously generate and cycle through only a portion of the wavelengths of light. For example, the light source 202 can be configured to continuously generate and cycle through only a selected portion (e.g., three wavelengths of light, ten wavelengths of light, etc.) of the wavelengths of light that the light source 202 can potentially generate. The selected portion can be determined or configured by personnel operating the programmable light generator 200. In this example, other wavelengths of light capable of being generated by the light source 202 are not generated by the light source 202. Many variations are possible.

In some embodiments, the light source 202 can be configured to continuously generate and cycle through wavelengths of light or different types of wavelengths of light. For example, the light source 202 can be configured to generate a first type of wavelengths of light that corresponds to a center frequency of a channel of a CWDM (e.g., the CWDM 104 of FIGS. 1A-1C) and a second type of wavelengths of light that corresponds to a center frequency of a channel of a DWDM (e.g., the DWDM 114 and/or the DWDM 116 of FIGS. 1A-1C). In this example, the first type of wavelengths of light has a wider channel width than the second type of wavelengths of light. The different types of wavelengths of light can be multiplexed by the optical multiplexer 210.

In some embodiments, the light source 202 can be configured to generate wavelengths of light at fixed optical power levels. The light source 202 can be calibrated such that each of the wavelengths of light is generated at a fixed optical power level. In some cases, all or a portion of the wavelengths of light generated by the light source 202 can be calibrated to a fixed optical power level. As will be discussed later, fixed optical power levels can be used to determine an insertion loss of the optical network. In various embodiments, wavelengths of light generated by the light source 202 can be tuned (e.g., calibrated), through electronics that can control a laser, to be at fixed optical power levels.

The optical signal modulator 204 can be coupled to the light source 202. The optical signal modulator 204 can be configured to modulate wavelengths of light generated by the light source 202 to encode frequency information associated with the wavelengths of light onto the wavelengths of light. For example, the light source 202 can generate two wavelengths of light with one wavelength of light corresponding to 1547.72 nm and the other wavelength of light corresponding to 1548.51 nm. In this example, the optical signal modulator 204 can modulate the 1547.72 nm wavelength of light to encode frequency information of the 1547.72 nm wavelength of light (i.e., 193.7 THz) onto the 1547.72 nm wavelength of light at 193.7 THz. Likewise, the optical signal modulator 204 can modulate the 1548.51 nm wavelength of light to encode frequency information of the 1548.51 nm wavelength of light (i.e., 193.6 THz) onto the 1548.51 nm wavelength of light at 193.6 THz. In this way, when the wavelengths of light are demultiplexed and demodulated downstream, the encoded frequency information can be decoded to identify channels of the optical network. The optical signal modulator 204 can encode frequency and other information associated with wavelengths of light using various encoding techniques. These encoding techniques can include, for example, non-return-to-zero (NRZ), pulse-amplitude modulation (PAM), phase-shift keying (PSK), frequency-shift keying (FSK), and the like. Many other encoding techniques are contemplated.

In some embodiments, the optical signal modulator 204 can be configured to modulate wavelengths of light to encode optical power information onto the wavelengths of light. In general, optical power of a light signal can correspond to an intensity (e.g., amplitude) of the light signal. An intensity of a light signal can decrease as the light signal travels through an optical network. This loss of intensity is inherent in every optical network and can be problematic for network operators. Loss of intensity of a light signal as it travels through an optical network is commonly referred to as an insertion loss for the optical network. By encoding optical power information onto wavelengths of light at a transmitting end, an insertion loss for the optical network can be determined at a receiving end. For example, the light source 202 can generate at least one wavelength of light. In this example, the optical signal modulator 204 can modulate the wavelength of light to encode optical power information (e.g., x dBm) associated with the wavelength of light onto the wavelength of light. The wavelength of light can be multiplexed and demultiplexed through the optical network. A light receiver can be configured to receive the wavelength of light at an output of a demultiplexer and measure optical power associated with the wavelength of light (e.g., y dBm). In addition, the light receiver can decode the optical power information previously encoded onto the wavelength of light (e.g., x dBm). In this example, the light receiver can compare the decoded optical power information with the measured optical power to compute an insertion loss for the optical network (e.g., x dBm–y dBm).

In some embodiments, the optical signal modulator 204 can be configured to modulate wavelengths of light to encode identification information onto the wavelengths of light. Encoding identification information of a device (e.g., the programmable light generator 200) from which wavelengths of light are generated can be helpful in scenarios in which more than one device is used in identifying channels of an optical network. For example, a first programmable light generator can be configured to generate a first set of wavelengths of light that is encoded with identification information of the first programmable light generator. A second programmable light generator can be configured to generate a second set of wavelengths of light that is encoded with identification information of the second programmable light generator. In this example, after the two sets of wavelengths of light are multiplexed and demultiplexed through an optical network, the identification information of the two sets of wavelengths of light can be decoded to determine which programmable light generator generated which set of wavelengths of light. In this way, various sets of wavelengths of light can be differentiated, thereby allowing channels of the optical network to be properly identified.

The optical attenuator 206 can be coupled to the optical signal modulator 204. The optical attenuator 206 can be configured to attenuate optical power of wavelengths of light to a selected optical power level. In general, an optical attenuator can be a device or component that can attenuate an intensity of a light signal to a known intensity (e.g., a known attenuation level). A fixed optical attenuator can attenuate optical power of a light signal by a fixed optical power level or amount. In contrast, a variable optical attenuator, such as a programmable optical attenuator, can to configured to attenuate optical power of a light signal by a plurality of optical power levels or amounts based on how the variable optical attenuator is configured. In some embodiments, the optical attenuator 206 can be implemented as a fixed optical attenuator. In other embodiments, the optical attenuator 206 can be implemented as a variable optical attenuator. In such embodiments, the optical attenuator 206 can adjust a level or amount of attenuation based on optical power of the wavelengths of light. For example, a light signal can have an optical power of 0 dBm at an input of a variable optical attenuator. The variable optical attenuator can be configured such that a light signal coming out of the variable optical attenuator has an optical power of −2 dBm. In this example, the variable optical attenuator can be configured to have an attenuation level of −2 dBm so that the output light signal has an optical power of −2 dBm. In another example, the light signal at the input can have an optical power of −1 dBm. In this example, the variable optical attenuator can be configured to have an attenuation level of −1 dBm. In this way, the output optical power of −2 dBm can be maintained. As such, the optical attenuator 206 can ensure that the optical power of the wavelengths of light is maintained at a known or desired optical power level. In this way, an insertion loss for the optical network can be accurately determined. In various embodiments, optical power of wavelengths of light as attenuated by the optical attenuator 206 can be encoded onto the wavelengths of light by the optical signal modulator 204 as described.

The optical tap 208 can be coupled to the optical attenuator 206. The output of the optical tap 208 can be wavelengths of light that can be multiplexed into a multiplexed light signal by the optical multiplexer 210. The multiplexed light signal can be injected into an express port of a multiplexer (e.g., the express port of the DWDM 112 of FIG. 1A or the express port of the CWDM 102 of FIGS. 1B, 1D), thereby bypassing multiplexing otherwise performed by the multiplexer. In this way, the programmable light generator 200 can generate a multiplexed light signal with encoded information that can travel through the optical network and be decoded to identify channels of the optical network. The optical tap 208 also can extract a portion of the wavelengths of light and divert the extracted portion of the wavelengths of light to the optical power meter 212. As just one example, in some embodiments, the optical tap 208 can divert 1% of the wavelengths of light to the optical power meter 212 while allowing 99% of the wavelengths of light to be multiplexed by the optical multiplexer 210. In other embodiments, the optical tap 208 can divert more than 1% of the wavelengths of light to the optical power meter 212. Many variations are contemplated.

The optical power meter 212 can be coupled to the optical tap 208. The optical power meter 212 can be configured to measure optical power of diverted wavelengths of light from the optical tap 208. The optical power meter 212 can measure an intensity of the diverted wavelengths of light. In some embodiments, the optical power measured by the optical power meter 212 can be provided to the one or more processors 214 to adjust optical power of wavelengths of light from which the diverted wavelengths of light were extracted. In this regard, the optical power meter 212 in conjunction with the processor(s) 214 can form a feedback loop to control the optical power of the wavelengths of light. The processor(s) 214 can determine an adjustment to the optical power of the wavelengths of light to a desired optical power level in a number of ways. In one implementation, the processor(s) 214 can adjust the optical power of the wavelengths of light by instructing the light source power supply 216 to increase or decrease optical power of the wavelengths of light generated by the light source 202. The power supply 216 can adjust the optical power of the wavelengths of light by adjusting a supply current to the light source 202. In another implementation, the processor(s) 214 can adjust the optical power of the wavelengths of light by instructing the optical attenuator 206 to vary an attenuation level. In this way, optical power of wavelengths of light generated by the programmable light generator 200 can be maintained at a known or desired optical power level through the feedback loop. In some embodiments, the processor(s) 214 can instruct the optical signal modulator 204 to encode optical power information onto wavelengths of light as described. In other embodiments, the processor(s) 214 can store the optical power information to a memory (not shown) associated with the programmable light generator 200. In such embodiments, the stored optical power information can be later accessed to compute an insertion loss for the optical network. For example, the programmable light generator 200 can generate wavelengths of light at a fixed optical power level (e.g., x dBm) through the feedback loop described. For example, when optical power of the wavelengths of light measured by the optical power meter 212 exceeds the fixed optical power level (e.g., a setpoint), the processor(s) 214 can instruct the optical attenuator 206 to increase attenuation to reduce the optical power of the wavelengths of light. When the optical power of the wavelengths of light measured by the optical power meter 212 falls below the fixed optical power level, the processor(s) 214 can instruct the light source power supply 216 to increase power delivered to the light source 202 to increase the optical power of the wavelengths of light. The fixed optical power level can be stored in a memory associated with the programmable light generator 200. The wavelengths of light can be multiplexed and demultiplexed through an optical network and received by a light receiver (e.g., the light receiver 122 of FIG. 1D). In this example, the light receiver can measure optical power of the wavelengths of light (e.g., y dBm) and compare the measured optical power to the fixed optical power level stored in the programmable light generator 200 to compute an insertion loss for the optical network (e.g., x dBm-y dBm). In this way, optical power information need not be modulated on wavelengths of light as described.

The optical multiplexer 210 can be coupled to the optical tap 208. The optical multiplexer 210 can be configured to multiplex wavelengths of light outputted by the optical tap 208 into a multiplexed light signal.

Figure 2B:
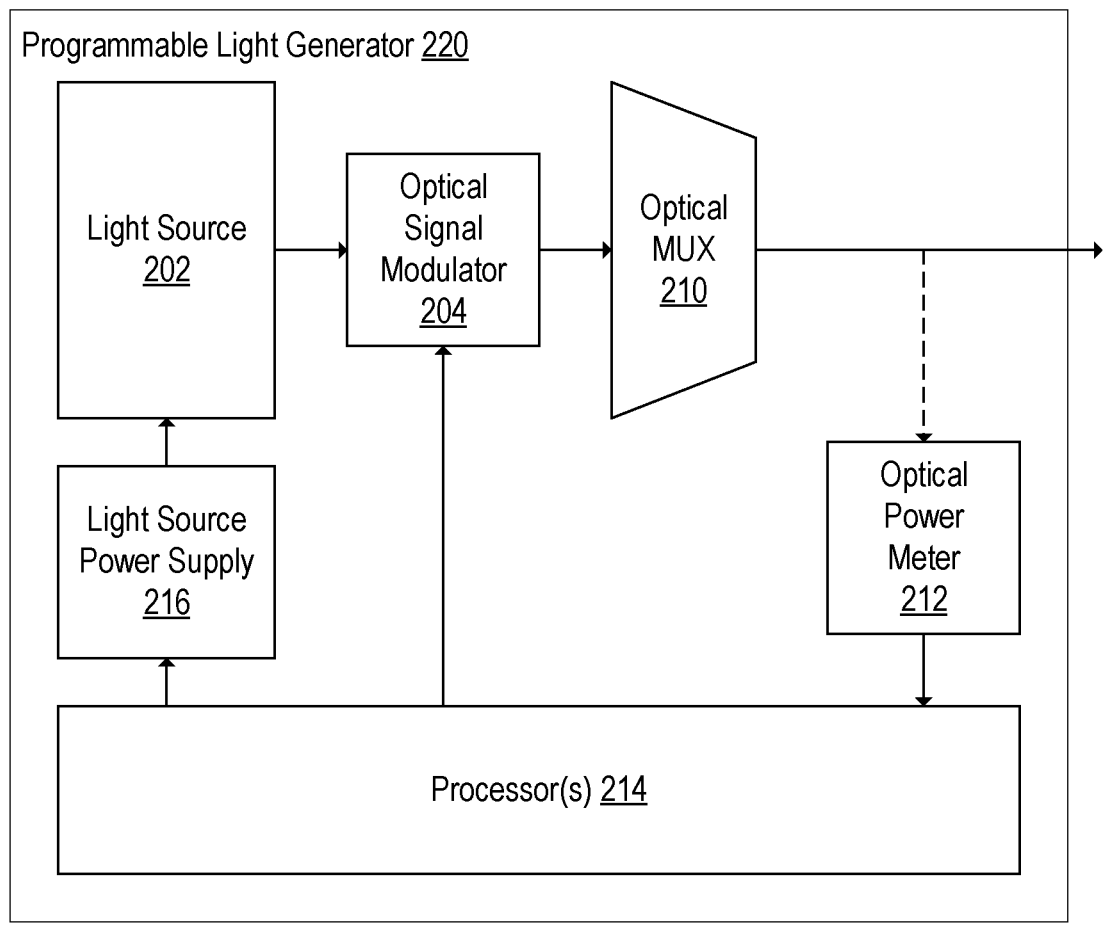

FIG. 2B illustrates an example programmable light generator 220, according to various embodiments of the present technology. Unlike the programmable light generator 200 of FIG. 2A, in the programmable light generator 220 of FIG. 2B, the optical power meter 212 does not actively or continuously measure optical power associated with a multiplexed light signal as the multiplexed light signal is generated. Instead, the optical power meter 212 in FIG. 2B premeasures optical power associated with a multiplexed light signal and stores the optical power to a memory (not shown) associated with the programmable light generator 220 prior to injecting the multiplexed light signal into an optical network for channel identification. When the programmable light generator 220 is to generate a multiplexed light signal for injection into the optical network, the stored optical power information (and other information) can be modulated onto the multiplexed light signal through the optical signal modulator 206.

Figure 2C:
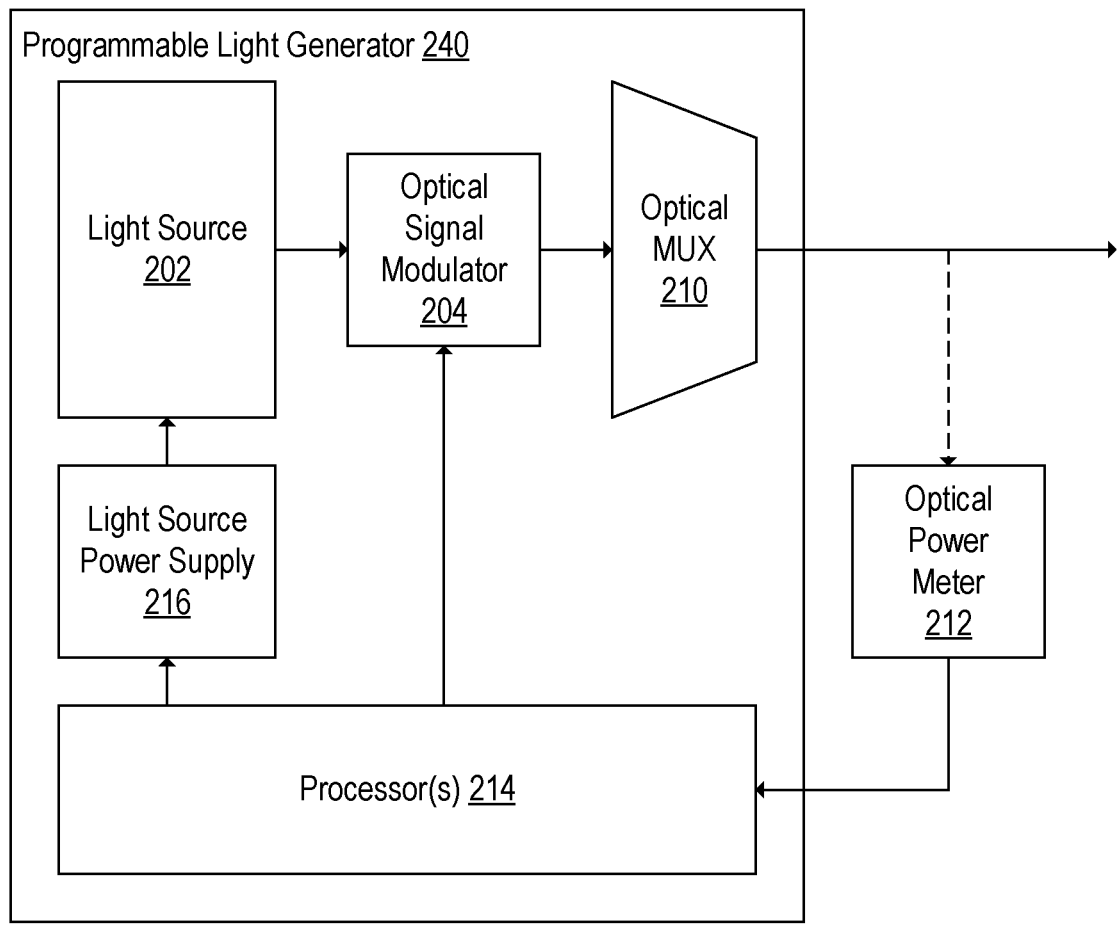

FIG. 2C illustrates an example programmable light generator 240, according to various embodiments of the present technology. Unlike the programmable light generator 220 of FIG. 2B, in the programmable light generator 240 of FIG. 2C, the optical power meter 212 is not a part of the programmable light generator 240. Rather, the optical power meter 212 of FIG. 2C is a separate external device. Similar to the programmable light generator 220 of FIG. 2B, the optical power meter 212 of the programmable light generator 240 of FIG. 2C does not actively or continuously measure optical power associated with a multiplexed light signal as the multiplexed light signal is generated. Instead, the optical power meter 212 premeasures optical power associated with a multiplexed light signal and stores the optical power to a memory (not shown) associated with the programmable light generator 240 prior to injecting the multiplexed light signal into an optical network for channel identification. When the programmable light generator 240 is to generate a multiplexed light signal for injection into the optical network, the stored optical power information (and other information) is modulated onto the multiplexed light signal through the optical signal modulator 206.

Figure 2D:
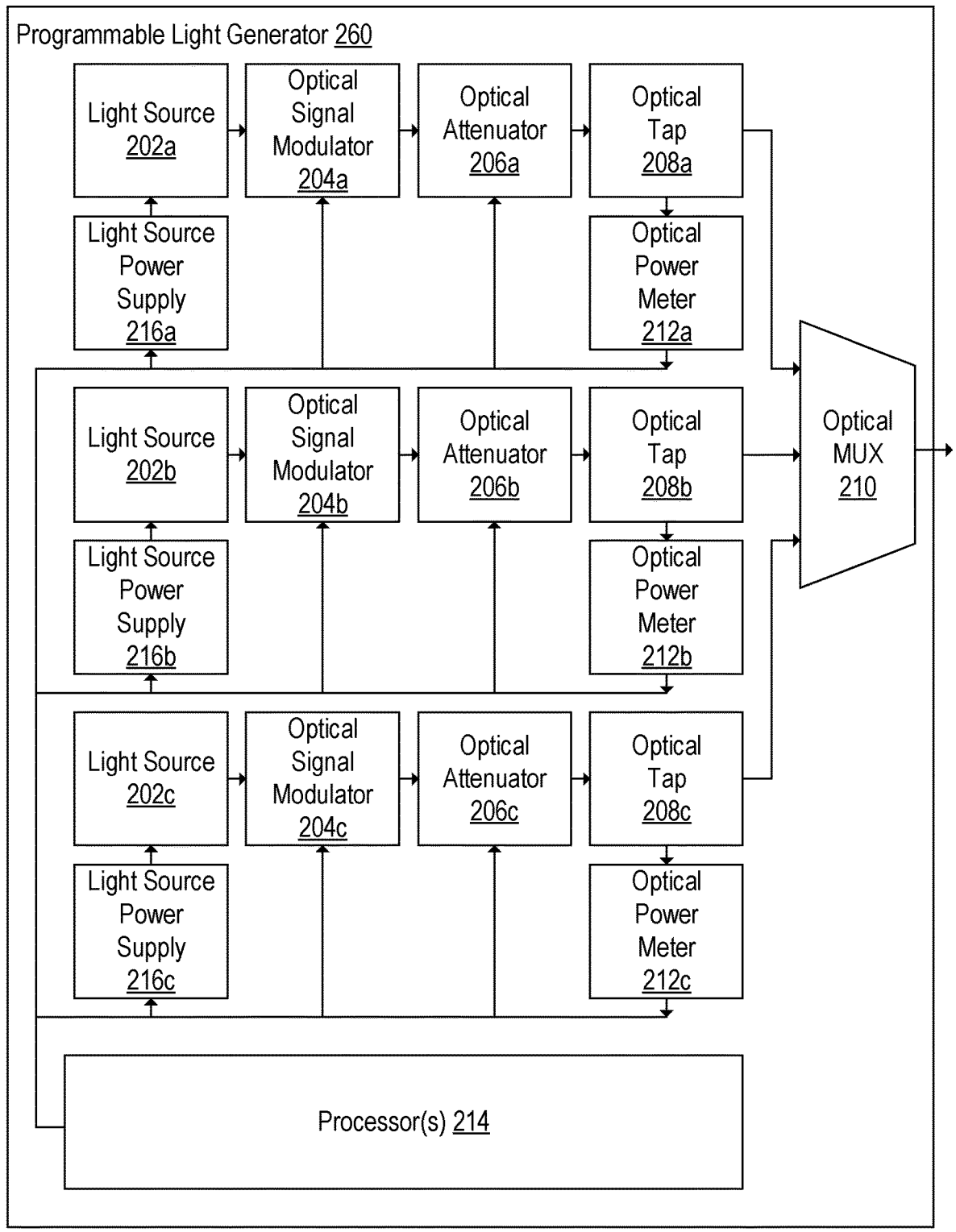

FIG. 2D illustrates an example programmable light generator 260, according to various embodiments of the present technology. In some embodiments, the programmable light generator 120 of FIGS. 1C, 1E can be implemented as the programmable light generator 260. The programmable light generator 260 can be configured to simultaneously generate wavelengths of lights that correspond to different WDMs of an optical network. As shown in FIG. 2D, in some embodiments, the programmable light generator 260 can include light sources 202a-202c. While three light sources 202a-202c are shown for purposes of illustration, the present technology can be implemented with any suitable number of light sources (e.g., two light sources, four light sources, etc.). The light sources 202a-202c can be configured to generate wavelengths of light simultaneously with one another. Further, each of the lights sources 202a-202c can be configured to continuously generate and cycle through wavelengths of light associated with a particular WDM. For example, the light source 202a can generate wavelengths of light that correspond to channels of a CWDM (e.g., the CWDM 104 of FIG. 1C, 1E), the light source 202b can generate wavelengths of light that correspond to channels of a first DWDM (e.g., the DWDM 114 of FIG. 1C, 1E), and the light source 202c can generate wavelengths of light that correspond to channels of a second DWDM (e.g., the DWDM 116 of FIG. 1C. 1E). In this example, the light sources 202a-202c can simultaneously generate their respective wavelengths of light, while each light source cycles through the wavelengths of light associated with the light source. In some embodiments, the wavelengths of lights generated by the programmable light generator 260 can be of different types. For example, wavelengths of light generated by the light source 202a can be of a first type (e.g., "wavelength A," "wavelength B," etc. of FIG. 1C, 1E) and wavelengths of light generated by the light sources 202b-202c can be of a second type (e.g., "wavelength a," "wavelength b," etc. of FIG. 1C, 1E). As shown in FIG. 2D, the programmable light generator 260 can further include optical signal modulators 204a-204c, optical attenuators 206a-206c, optical taps 208a-208c, optical power meters 212a-212c, and light source power supplies 216a-216c. The optical signal modulators 204a-204c, the optical attenuators 206a-206c, the optical taps 208a-208c, the optical power meters 212a-212c, and the light source power supplies 216a-216c of the programmable light generator 260 can operate in a manner similar to the optical signal modulator 204, the optical attenuator 206, the optical tap 208, the optical power meter 212, and the light source power supply 216 of the programmable light generator 200 of FIG. 2A. For example, the wavelengths of lights corresponding to different WDMs can be modulated through optical modulators 204a-204c, respectively, to encode frequency information, optical power information, and device information associated with the wavelengths of light. As another example, the wavelengths of lights corresponding to different WDMs can be attenuated by optical attenuators 206a-206c, respectively, to attenuate optical powers of the wavelengths of light to one or more selected optical power levels. The optical multiplexer 210 can multiplex the wavelengths of lights generated by the light sources 202a-202c into a multiplexed light to be injected into the optical network for channel identification.

Figure 3:
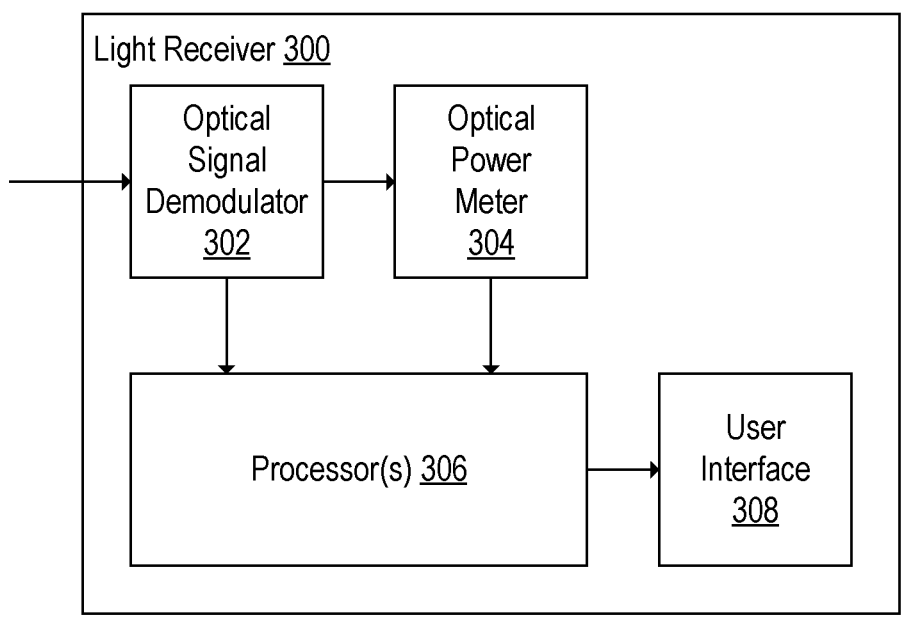
FIG. 3 illustrates an example light receiver, according to various embodiments of the present technology.

FIG. 3 illustrates an example light receiver 300, according to various embodiments of the present technology. In some embodiments, the light receiver 122 of FIGS. 1A-1C can be implemented as the light receiver 300. As discussed above, the light receiver 300 can be coupled to an output channel at a receiving end of an optical network (e.g., the optical network 100 of FIGS. 1A-1C) to receive a wavelength of light generated by a programmable light generator (e.g., the programmable light generator 120 of FIGS. 1A-1C). By the time the wavelength of light is received by the light receiver 300, the wavelength of light has been multiplexed and demultiplexed through the optical network. In some embodiments, the light receiver 300 can comprise an optical signal demodulator 302, an optical power meter 304, one or more processors 306, and a user interface 308. The optical signal demodulator 302 can receive a demultiplexed wavelength of light and demodulate the wavelength of light to decode frequency information associated with the wavelength of light, optical power information associated with the wavelength of light, and identification information associated with a programmable light generator from which the wavelength of light was generated. This information can be processed by the processor(s) 306 and displayed to a user (e.g., on-site field personnel) operating the light receiver 300 through the user interface 308. For example, a central processing unit and/or a graphics processing unit can be configured to process information decoded from a demodulated wavelength of light and provide the information for display on a user interface. Based on the frequency information provided through the user interface 308, the user can verify that the wavelength of light received by the light receiver 300 has been provided to the correct channel. For example, a 1577.03 nm light can be received by the light receiver 300 through an output channel with a center frequency of 190.1 THz. In this example, frequency information (i.e., 190.1 THz) encoded onto the 1577.03 nm light can be decoded and displayed through the user interface 308 by the light receiver 300. In this example, the user can confirm that the 1577.03 nm light was multiplexed and demultiplexed through the correct output channel by confirming the frequency information matches the center frequency of the output channel. In addition, the user can view the identification of the programmable light generator that generated the wavelength of light and the optical power information of the wavelength of light at the time when it was generated. In this way, the user can verify that the wavelength of light received was generated from a known light source. The optical power information can be used by the user to determine an insertion loss for the optical network.

The optical power meter 304 can be coupled to the optical signal demodulator 302. The optical power meter 304 can measure optical power of the wavelength of light as received by the light receiver 300. The measured optical power can be compared with the decoded optical power to determine the insertion loss for the optical network. For example, a wavelength of light can have a measured optical power of −1 dBm and optical power decoded from the wavelength of light can be 0 dBm. In this example, an insertion loss can be determined to be −1 dBm. In some embodiments, the insertion loss for the optical network can be automatically computed by the light receiver 300 and provided to the user through the user interface 308.

FIG. 4 illustrates an example data packet 400, according to various embodiments of the present technology. The data packet 400 can be encoded onto a multiplexed light signal by an optical signal modulator (e.g., the optical signal modulator 206 of FIG. 2A). The data packet 400 can be decoded from an encoded wavelength of light by an optical signal demodulator (e.g., the optical signal demodulator 302 of FIG. 3). As shown in FIG. 4, in some embodiments, the data packet 400 can include header information 402, frequency information 404, optical power information 406, and identification information 408. The header information 402 can comprise a sync binary bit pattern that can indicate a start of the data packet 400. The sync binary bit pattern can indicate to a processor of a light receiver (e.g., the processor(s) 306 of the light receiver 300 of FIG. 3) that subsequent bits following the sync binary bit pattern correspond to the frequency information 404, the optical power information 406, and the identification information 408. The frequency information 404 can comprise a binary bit pattern that indicates frequency of the wavelength of light. The optical power information 406 can comprise a binary bit pattern that indicates optical power of the wavelength of light at a transmitting end. The optical power information 406 can be used to determine an insertion loss for an optical network. The identification information 408 can comprise a binary bit pattern that indicates an identification of a programmable light generator (e.g., the programmable light generator 120 of FIGS. 1A-1C) from which the multiplexed light was generated.

Figure 5A:
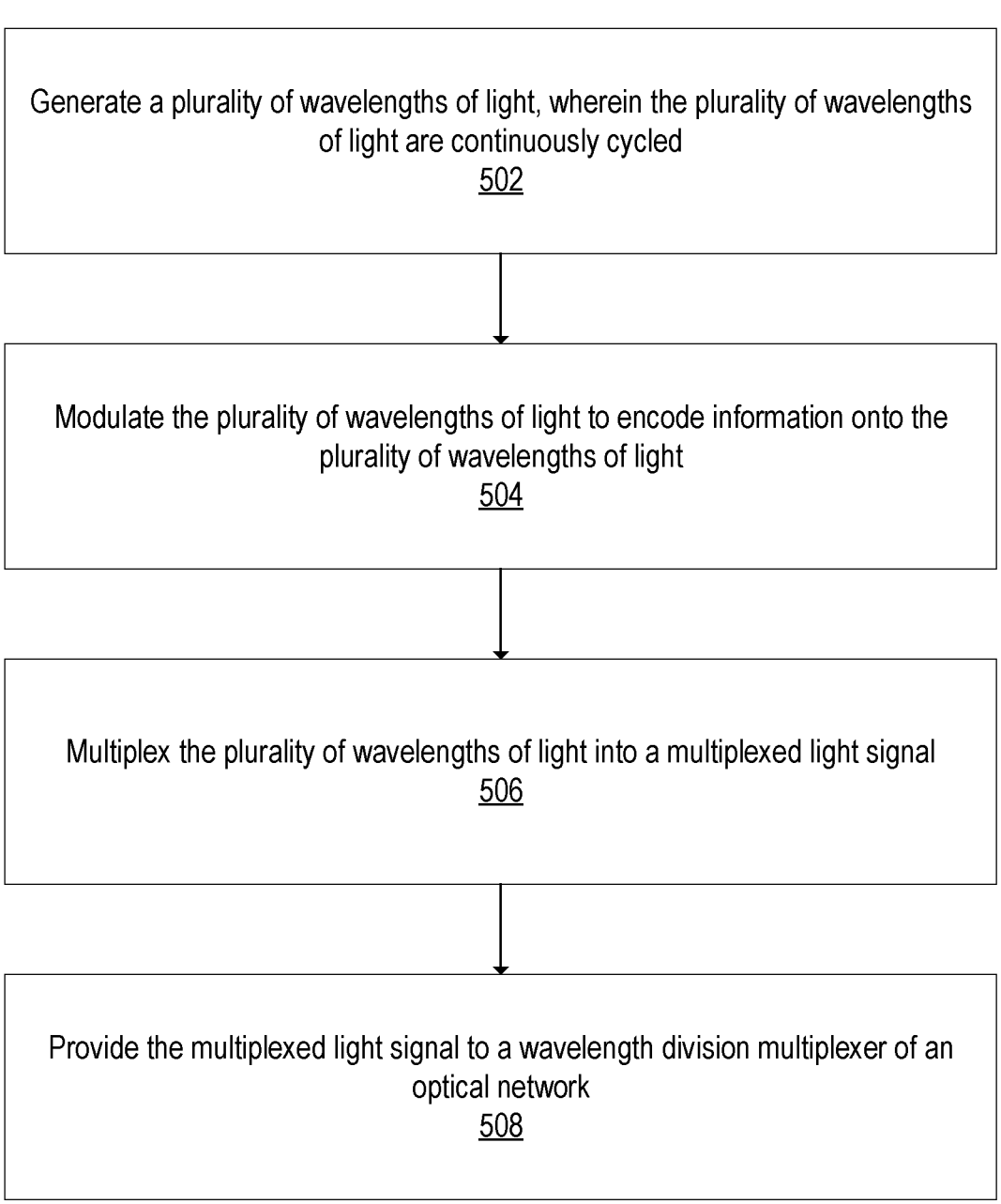
FIGS. 5A-5B illustrate example methods, according to various embodiments of the present technology.

FIG. 5A illustrates an example method 500, according to various embodiments of the present technology. It should be appreciated that there can be additional, fewer, or alternative steps performed in similar or alternative orders, or in parallel, within the scope of the various embodiments discussed herein unless otherwise stated.

At block 502, the example method 500 can generate a plurality of wavelengths of light. At block 504, the example method 500 can modulate the plurality of wavelengths of light to encode information onto the plurality of wavelengths of light. The plurality of wavelengths of light can be continuously cycled. At block 506, the example method 500 can multiplex the plurality of wavelengths of light into a multiplexed light signal. At block 508, the example method 500 can provide the multiplexed light signal into a wavelength division multiplexer of an optical network. It is contemplated that there can be many other uses, applications, and/or variations associated with the various embodiments of the present technology.

Figure 5B:
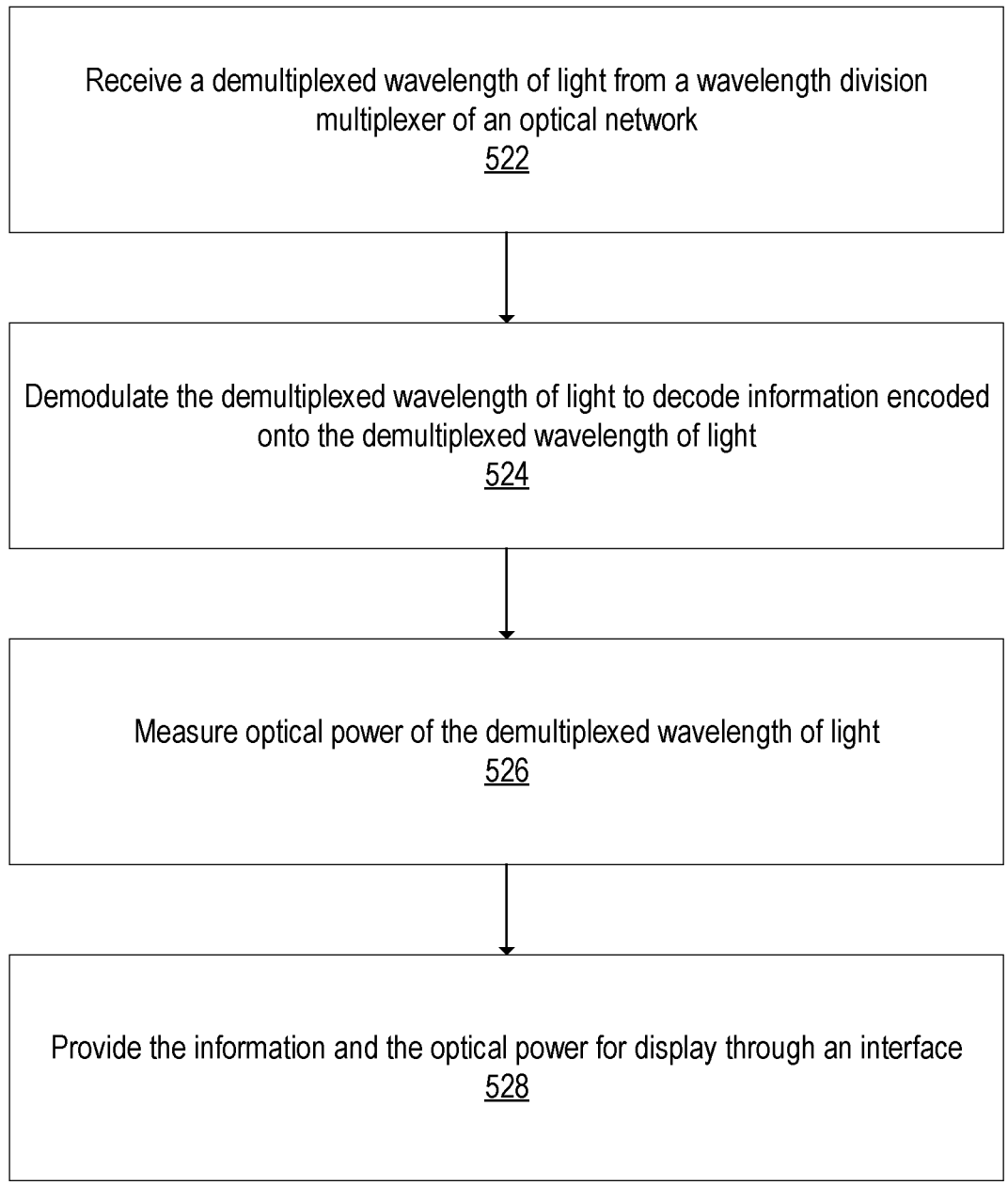

FIG. 5B illustrates an example method 520, according to various embodiments of the present technology. It should be appreciated that there can be additional, fewer, or alternative steps performed in similar or alternative orders, or in parallel, within the scope of the various embodiments discussed herein unless otherwise stated.

At block 522, the example method 520 can receive a demultiplexed wavelength of light from a wavelength division multiplexer of an optical network. At block 524, the example method 520 can demodulate the demultiplexed wavelength of light to decode information encoded onto the demultiplexed wavelength of light. At block 526, the example method 520 can measure optical power of the demultiplexed wavelength of light. At block 528, the example method 520 can provide the information and the optical power for display through an interface. It is contemplated that there can be many other uses, applications, and/or variations associated with the various embodiments of the present technology.

Hardware Implementation

Figure 6:
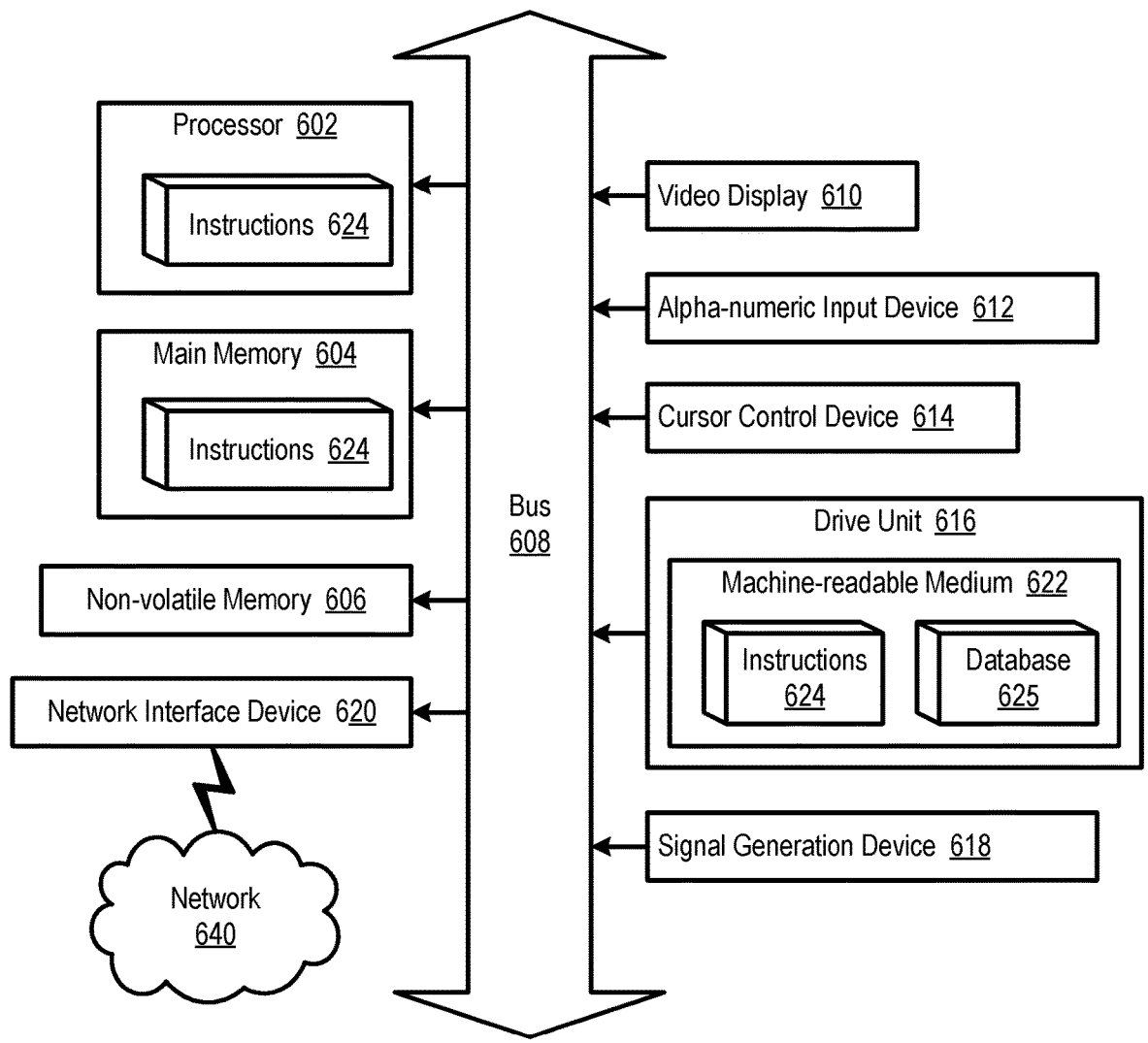
FIG. 6 illustrates an example of a computing system to implement one or more embodiments described herein, according to various embodiments of the present technology.

The foregoing processes and features can be implemented by a wide variety of machine and computing system architectures and in a wide variety of network and computing environments. FIG. 6 illustrates an example of a computing system (or computing device) 600 that may be used to implement one or more of the embodiments described herein according to various embodiments of the present technology. The computing system 600 includes sets of instructions 624 for causing the computing system 600 to perform the processes and features discussed herein. The computing system 600 may be connected (e.g., networked) to other machines and/or computer systems. In a networked deployment, the computing system 600 may operate in the capacity of a server or a client machine in a client-server network environment, or as a peer machine in a peer-to-peer (or distributed) network environment.

The computing system 600 includes a processor 602 (e.g., a central processing unit (CPU), a graphics processing unit (GPU), or both), a main memory 604, and a nonvolatile memory 606 (e.g., volatile RAM and non-volatile RAM, respectively), which communicate with each other via a bus 608. In some embodiments, the computing system 600 can be a desktop computer, a laptop computer, personal digital assistant (PDA), or mobile phone, for example. In one embodiment, the computing system 600 also includes a video display 610, an alphanumeric input device 612 (e.g., a keyboard), a cursor control device 614 (e.g., a mouse), a drive unit 616, a signal generation device 618 (e.g., a speaker) and a network interface device 620.

In one embodiment, the video display 610 includes a touch sensitive screen for user input. In one embodiment, the touch sensitive screen is used instead of a keyboard and mouse. The disk drive unit 616 includes a machine-readable medium 622 on which is stored one or more sets of instructions 624 (e.g., software) embodying any one or more of the methodologies or functions described herein. The instructions 624 can also reside, completely or at least partially, within the main memory 604 and/or within the processor 602 during execution thereof by the computing system 600. The instructions 624 can further be transmitted or received over a network 640 via the network interface device 620. In some embodiments, the machine-readable medium 622 also includes a database 625.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 606 may also be a random access memory. The non-volatile memory 606 can be a local device coupled directly to the rest of the components in the computing system 600. A non-volatile memory that is remote from the system, such as a network storage device coupled to any of the computer systems described herein through a network interface such as a modem or Ethernet interface, can also be used.

While the machine-readable medium 622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computing system 600 to perform any one or more of the processes and features described herein.

In general, routines executed to implement the embodiments of the invention can be implemented as part of an operating system or a specific application, component, program, object, module or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually effect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in both method and apparatus modes.

Further, each of the various elements of the invention and claims may also be achieved in a variety of manners. This technology should be understood to encompass each such variation, be it a variation of an embodiment of any apparatus embodiment, a method or process embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   generating, by a device, a plurality of wavelengths of light;
   modulating, by the device, the plurality of wavelengths of light to encode information onto the plurality of wavelengths of light, wherein the information includes identification information associated with the device and optical power information associated with the plurality of wavelengths of light and the information including the identification information and the optical power information can be decoded by demodulation of the plurality of wavelengths of light;
   multiplexing, by the device, the plurality of wavelengths of light into a multiplexed light signal; and
   providing, by the device, the multiplexed light signal to a wavelength division multiplexer of an optical network.

2. The computer-implemented method of claim 1, wherein the plurality of wavelengths of light correspond to center frequencies of channels of the wavelength division multiplexer.

3. The computer-implemented method of claim 1, wherein the multiplexed light signal is provided to an express port of the wavelength division multiplexer.

4. The computer-implemented method of claim 1, wherein the information further includes frequency information associated with the plurality of wavelengths of light.

5. The computer-implemented method of claim 1, wherein the identification information associated with the device identifies the device.

6. The computer-implemented method of claim 1, wherein the information is encoded onto the multiplexed light signal based at least on one of a non-return-to-zero, pulse-amplitude modulation, phase-shift keying, or frequency-shift keying technique.

7. The computer-implemented method of claim 1, further comprising:
   extracting, by the device, a portion of the plurality wavelengths of light prior to the multiplexing;
   measuring, by the device, optical power of the portion of the plurality of wavelengths of light; and
   adjusting, by the device, optical power of the plurality of wavelengths of light based on the optical power of the portion of the plurality wavelengths of light.

8. The computer-implemented method of claim 1, further comprising:
   adjusting, by the device, the plurality of wavelengths of light to a selected optical power level prior to the multiplexing.

9. The computer-implemented method of claim 8, further comprising:
   extracting, by the device, a portion of the plurality wavelengths of light prior to the multiplexing;
   measuring, by the device, optical power of the portion of the plurality wavelengths of light; and
   adjusting, by the device, an optical power attenuation level of the plurality wavelengths of light based on the optical power of the portion of the plurality wavelengths of light.

10. The computer-implemented method of claim 1, wherein the information encoded onto the plurality wavelengths of light is decoded, and a determination of insertion loss associated with the optical network is made based on the information.

11. The computer-implemented method of claim 1, wherein the plurality of wavelengths of light are a portion of the wavelengths of light that are capable of being generated by the device.

12. The computer-implemented method of claim 1, wherein the plurality of wavelengths of light include at least two types of wavelengths of light that have a different wavelength, wherein a first type of wavelengths of light has a wider channel width than a second type of wavelengths of light.

13. The computer-implemented method of claim 12, wherein the plurality of wavelengths of light that are of the first type correspond to center frequencies of channels of at least one coarse wavelength division multiplexer and the plurality of wavelengths of light that are of the second type correspond to center frequencies of channels of at least one dense wavelength division multiplexer.

14. The computer-implemented method of claim 1, wherein the plurality of wavelengths of light are generated by one or more light sources.

15. The computer-implemented method of claim 14, further comprising:
simultaneously generating, by the device, at least one wavelength of light of a first type and at least one wavelength of light of a second type.

16. A computer-implemented method comprising:
receiving, by a device, a demultiplexed wavelength of light from a wavelength division multiplexer of an optical network;
demodulating, by the device, the demultiplexed wavelength of light to decode information encoded onto the demultiplexed wavelength of light, wherein the information includes identification information associated with the device and optical power information associated with the demultiplexed wavelength of light;
measuring, by the device, optical power of the demultiplexed wavelength of light; and
providing, by the device, the information and the optical power for display through an interface.

17. The computer-implemented method of claim 16, wherein the information includes at least one of frequency information associated with the demultiplexed wavelength of light, optical power information associated with the demultiplexed wavelength of light measured at a transmitting end of the optical network, or identification information associated with a generator from which the demultiplexed wavelength of light was generated.

18. The computer-implemented method of claim 16, further comprising:
determining, by the device, insertion loss associated with the optical network based on the information and the optical power; and
providing, by the device, the insertion loss for display through the interface.

19. The computer-implemented method of claim 16, wherein the demultiplexed wavelength of light is demultiplexed from a multiplexed light signal generated by a generator at a transmitting end of the optical network through the wavelength division multiplexer.

20. A system comprising:
a generator, coupled to an optical network, comprising:
a light source configured to generate a plurality of wavelengths of light;
an optical signal modulator, coupled to the light source, configured to modulate the plurality of wavelengths of light to encode information onto the plurality of wavelengths of light, wherein the information includes identification information associated with the generator and optical power information associated with the plurality of wavelengths of light;
an optical multiplexer, coupled to the optical signal modulator, configured to multiplex the plurality of wavelengths of light into a multiplexed light signal;
a power supply, coupled to the light source, configured to provide power to the light source; and
one or more first processors, coupled to the power supply and the optical signal modulator, configured to control the power supply and the optical signal modulator; and
a receiver, coupled to the generator and the optical network, comprising:
an optical signal demodulator configured to receive a demultiplexed wavelength of light through the optical network and decode information encoded onto the demultiplexed wavelength of light based on demodulation of the demultiplexed wavelength of light, wherein the demultiplexed wavelength of light is associated with the multiplexed light signal;
an optical power meter, coupled to the optical signal demodulator, configured to measure optical power of the demultiplexed wavelength of light; and
one or more second processors, coupled to the optical signal demodulator and the optical power meter, configured to provide the decoded information and the optical power for display through an interface.

* * * * *